United States Patent
Tsuria et al.

(10) Patent No.: US 6,466,670 B1
(45) Date of Patent: Oct. 15, 2002

(54) SYSTEM FOR PREVENTING PLAYBACK OF UNAUTHORIZED DIGITAL VIDEO RECORDINGS

(75) Inventors: Yossef Tsuria, Jerusalem (IL); Yishai Sered, Jerusalem (IL)

(73) Assignee: NDS Limited, Middlesex (GB)

( * ) Notice: Subject to any disclaimer, the term of this patent is extended or adjusted under 35 U.S.C. 154(b) by 0 days.

(21) Appl. No.: 09/481,739

(22) Filed: Jan. 11, 2000

Related U.S. Application Data (63) Continuation of application No. PCT/IL99/00127, filed on Mar. 4, 1999.

(30) Foreign Application Priority Data

May 21, 1998 (IL) .................................................. 124595

(51) Int. Cl.[7] .............................................. H04N 7/167
(52) U.S. Cl. ....................................................... 380/202
(58) Field of Search ................................. 380/202, 201, 380/210, 214, 215, 217, 241, 242; 173/176, 168; 705/51, 57, 58

(56) References Cited

U.S. PATENT DOCUMENTS

| | | | |
|---|---|---|---|
| 5,606,609 A | 2/1997 | Houser et al. ................... 380/4 |
| 5,607,188 A | 3/1997 | Bahns et al. ................ 283/113 |
| 5,636,292 A | 6/1997 | Rhoads ........................ 382/232 |
| 5,659,726 A | 8/1997 | Sandford, II et al. ....... 395/612 |
| 5,664,018 A | 9/1997 | Leighton ...................... 380/54 |
| 5,687,236 A | 11/1997 | Moskowitz et al. .......... 380/28 |
| 5,721,788 A | 2/1998 | Powell et al. ............... 382/100 |
| 5,727,065 A | 3/1998 | Dillon .......................... 380/49 |
| 5,778,102 A | * 7/1998 | Sandford et al. ........... 382/239 |
| 5,870,754 A | * 2/1999 | Dimitrova et al. ............. 707/1 |
| 6,173,069 B1 | * 1/2001 | Daly et al. .................. 382/118 |
| 6,285,775 B1 | * 9/2001 | Wu et al. .................... 382/100 |

FOREIGN PATENT DOCUMENTS

| | | | |
|---|---|---|---|
| EP | 0 367 585 | 5/1990 | ............. H04H/9/00 |
| EP | 0 651 554 | 5/1995 | ............. H04N/1/21 |
| EP | 0 715 241 | 6/1996 | ............. G06F/1/00 |

(List continued on next page.)

OTHER PUBLICATIONS

Schneider, M. et al., "A Robust Content Based Digital Signature for Image Authentication," Proceedings of the International Conference on Image Processing, Sep. 1996, pp. 227–230, XP–002090178.

Wolfgang, R. and Edward J. Delp, "Overview of Image Security Techniques With Application in Multimedia Systems," Proceedings of the SPIE, vol. 3228, 1998, pp. 297–308, XP–002104655 1998.

(List continued on next page.)

Primary Examiner—Matthew Smithers
(74) Attorney, Agent, or Firm—Ladas & Parry (57) ABSTRACT

This invention discloses an anti-piracy system including video representation signature apparatus for computing a forbidden signature of a forbidden video representation, communication apparatus for communicating the forbidden signature to a playing device, and a playing device adapted to receive and play back a recorded video representation, the playing device including reception apparatus for receiving the forbidden signature communicated by the communication apparatus, recorded video representation signature apparatus for computing a signature of the recorded video representation, and playback control apparatus operative to prevent playback of the recorded video representation if the computed signature of the recorded video representation matches the forbidden signature communicated to the playing device

30 Claims, 5 Drawing Sheets

FOREIGN PATENT DOCUMENTS

| | | | |
|---|---|---|---|
| WO | WO 96/07272 | 3/1996 | .......... H04N/7/173 |
| WO | WO 96/41468 | 12/1996 | .......... H04N/5/913 |
| WO | WO 97/13248 | 4/1997 | ........... G11B/20/00 |
| WO | WO 97/21162 | 6/1997 | ............. G06F/1/00 |
| WO | WO 97/22206 | 6/1997 | .......... H04N/5/913 |
| WO | WO 97/26732 | 7/1997 | ............. H04L/9/00 |
| WO | WO 97/26733 | 7/1997 | ............. H04L/9/00 |
| WO | WO 97/34391 | 9/1997 | ............. H04L/9/00 |
| WO | WO 98/02864 | 1/1998 | ............ G09C/5/00 |
| WO | WO 98/03014 | 1/1998 | ............ H04N/7/08 |

OTHER PUBLICATIONS

Digimarc Corporation, Digimarc Watermarking Guide, 1997, pp. 1–18.

Digimarc Corporation, "Project Digilock—The Digital Content Protection Solution for Copy Control and Play Control," Presented by Macrovision Corporation and Digimarc Corporation, Fall 1997.

* cited by examiner

SYSTEM FOR PREVENTING PLAYBACK OF UNAUTHORIZED DIGITAL VIDEO RECORDINGS

This application is continuation of international application number PCT IL 99/00127, filed Mar. 4, 1999, now pending.

FIELD OF THE INVENTION

The present invention relates to anti-piracy systems for discouraging and/or preventing theft of items such as electronic representations, particularly electronic video representations.

BACKGROUND OF THE INVENTION

Anti-piracy methods and apparatus for discouraging and/or preventing theft of items such as electronic representations are well known in the art. Prominent among the methods is a class of methods known collectively as watermarking. In watermarking methods, a watermark signal is typically added to an electronic representation to be protected. In such methods the added signal typically carries information identifying the owner of the electronic representation, and may carry additional information such as an identification of a buyer of a copy of the electronic representation. The added signal is, in some case, visible but in many cases the added signal is disguised so that a potential thief or pirate could find the signal only with great difficulty. Another preferred attribute of watermarking methods is that alterations of the picture, such as adding noise, not erase the watermark.

Typical watermarking methods are described in the following:

Digimarc® Watermarking Guide, 1997, Digimarc Corporation, 521 SW 11th Ave., Suite 200, Portland, OR 97205;

Project DigiLock, The Digital Content Protection Solution for Copy Control and Play Control, presented by Macrovision Corporation and Digimarc Corporation, Fall, 1997;

European Patent Application EP 0 651 554 A1, assigned to Eastman Kodak Company;

PCT Patent Application WO 96/41468, assigned to Macrovision Corporation;

PCT Patent Application WO 97/13248, assigned to Philips Electronics N.V.;

PCT Patent Application WO 97/22206, assigned to Philips Electronics N.V.;

PCT Patent Application 97/26732, assigned to The Dice Company;

PCT Patent Application 97/26733, assigned to The Dice Company;

PCT Patent Application 97/34391, assigned to Leighton;

PCT Patent Application 98/02864, assigned to The Dice Company;

PCT Patent Application 98/03014, assigned to Philips Electronics N.V.;

U.S. Pat. No. 5,606,609 to Houser et al;

U.S. Pat. No. 5,607,188 to Bahns et al;

U.S. Pat. No. 5,636,292 to Rhoads;

U.S. Pat. No. 5,659,726 to Sandford, II et al;

U.S. Pat. No. 5,664.018 to Leighton; and

U.S. Pat. No. 5,687,236 to Moskowitz et al;

The disclosures of all references mentioned above and throughout the present specification are hereby incorporated herein by reference.

SUMMARY OF THE INVENTION

The present invention seeks to provide an improved anti-piracy system. In the present invention a video representation, including a plurality of frames, is assigned a signature, typically a signature based on frame characteristic values which represent characteristics visible to a viewer of the video representation. Thus, an attempt to alter the video representation in order to alter the signature such an attempt typically being analogous to well-known methods of altering a video representation in order to obliterate a watermark would alter the visible characteristics of the video representation.

A particular method of computing such a signature, based on selecting a plurality of frames and dividing each frame into a plurality of regions, is also provided. In this method, a particular region is chosen from each frame and some characteristic, such as average pixel value in the region, is used to characterize the frame. A signature is then computed based on the plurality, of characterizing values from the plurality of frames.

Preferably, the signature is transmitted to playing devices which will then reject, by refusing to play, any recording having the transmitted signature. Typically, the playing device will attempt to match a computed signature of a recording with the transmitted signature.

The term "match", as used throughout the present specification and claims in referring to comparison of signatures or a result of such comparison, is used in a broad sense to include not only a determination that two signatures are identical but also any analogous determination, using any appropriate signature mechanism, which establishes that the two signatures represent two acts of signing identical material. It is appreciated that there may be appropriate signature mechanisms for which two such matching signatures are not actually identical. For example and without limiting the generality of the foregoing in some signature methods based on public/private key systems, which are well known in the art, two such matching signatures may not be actually identical.

It is appreciated that the system of the present invention is particularly applicable in a case where all playing devices are built to conform to the system. It is also appreciated that the system of the present invention is particularly applicable to preventing the distribution of pirate copies of video material which has no legitimate distribution channel. One example of such video material is a master copy of an as-yet unreleased movie.

Although the present invention relates especially to video representations it is appreciated that similar methods could be applied in the case of other electronic representations such as audio representations.

There is thus provided in accordance with a preferred embodiment of the present invention a method for assigning a signature to a video representation, the video representation including a plurality of frames, the method including choosing a chosen plurality of frames from among the plurality of frames included in the video representation, for each of the chosen plurality of frames, computing a frame characteristic value, thus producing a plurality of frame characteristic values, and computing a function of the plurality of frame characteristic values and assigning a result of the function as the signature.

Further in accordance with a preferred embodiment of the present invention the function includes concatenation of the plurality of frame characteristic values.

Still further in accordance with a preferred embodiment of the present invention the video representation includes an MPEG representation, and each of the chosen plurality of frames includes an I-frame.

Additionally in accordance with a preferred embodiment of the present invention the method also includes communicating the signature to a playing device.

Moreover in accordance with a preferred embodiment of the present invention the method also includes providing a recorded video representation to the playing device, computing a signature of the recorded video representation, and preventing playback of the video representation in the playing device if the computed signature of the recorded video representation matches the signature communicated to the playing device.

Further in accordance with a preferred embodiment of the present invention the step of preventing playback includes preventing playback of the video representation in the playing device if the computed signature of the recorded video representation is identical to the signature communicated to the playing device.

Still further in accordance with a preferred embodiment of the present invention the step of preventing playback includes employing a signature comparison method to determine whether the computed signature of the recorded video representation matches the signature communicated to the playing device wherein the signature comparison method includes determining that a first signature and a second signature match even if the first signature is not identical to the second signature.

Additionally in accordance with a preferred embodiment of the present invention the step of computing a frame characteristic value includes dividing the frame into a plurality of regions, choosing one of the plurality of regions, and computing a region characteristic value of the chosen region and assigning the region characteristic value as the frame characteristic value.

Moreover in accordance with a preferred embodiment of the present invention the region characteristic value includes a function of average pixel value for the region.

Further in accordance with a preferred embodiment of the present invention the function of average pixel value produces a 1-bit value.

Still further in accordance with a preferred embodiment of the present invention the function of average pixel value produces a 1-bit value of "1" for a first one of the chosen plurality of frames.

Additionally in accordance with a preferred embodiment of the present invention the step of dividing the frame into a plurality of regions includes, for each frame in the chosen plurality of frames, dividing the frame into a plurality of regions each corresponding to one of the plurality of regions into which every other frame of the chosen plurality of frames is divided.

Moreover in accordance with a preferred embodiment of the present invention the step of choosing one of the plurality of regions includes choosing, for each frame in the chosen plurality of frames, a region corresponding to the region chosen in ever, other frame of the chosen plurality of frames.

Further in accordance with a preferred embodiment of the present invention the step of choosing one of the plurality of regions includes choosing, for at least one frame in the chosen plurality of frames a region not corresponding to a region chosen in at least one other frame of the chosen plurality of frames.

There is also provided in accordance with another preferred embodiment of the present invention an anti-piracy method including computing a forbidden signature of a forbidden video representation, communicating the forbidden signature to a playing device, providing a recorded video representation to the playing device, computing a signature of the recorded video representation and preventing playback of the recorded video representation in the playing device if the computed signature of the recorded video representation matches the forbidden signature communicated to the playing device.

Further in accordance with a preferred embodiment of the present invention the method also includes storing the forbidden signature at the playing device, and retrieving the forbidden signature before performing the preventing playback step.

There is also provided in accordance with another preferred embodiment of the present invention a system for assigning a signature to a video representation, the video representation including a plurality of frames, the system including frame selection apparatus for choosing a chosen plurality of frames from among the plurality of frames included in the video representation, a frame characteristic determination unit operative, for each of the chosen plurality of frames, to compute a frame characteristic value, thus producing a plurality of frame characteristic values, and signature apparatus for computing a function of the plurality of frame characteristic values and assigning a result of the function as the signature.

There is also provided in accordance with another preferred embodiment of the present invention an anti-piracy system including video representation signature apparatus for computing a forbidden signature of a forbidden video representation, communication apparatus for communicating the forbidden signature to a playing device, and a playing device adapted to receive and play back a recorded video representation, the playing device including reception apparatus for receiving the forbidden signature communicated by the communication apparatus, recorded video representation signature apparatus for computing a signature of the recorded video representation and playback control apparatus operative to prevent playback of the recorded video representation if the computed signature of the recorded video representation matches the forbidden signature communicated to the playing device.

Further in accordance with a preferred embodiment of the present invention the reception apparatus is operative to receive the forbidden signature during playback of a non-forbidden recorded video representation.

Still further in accordance with a preferred embodiment of the present invention the reception apparatus is also operative to receive an authorization message authorizing playback of the non-forbidden recorded video representation, and the authorization message includes the forbidden signature.

There is also provided in accordance with another preferred embodiment of the present invention a playing device adapted to receive and play back a recorded video representation, the playing device including reception apparatus for receiving a forbidden signature of a forbidden video representation, recorded video representation signature apparatus for computing a signature of the recorded video representation, and playback control apparatus operative to prevent playback of the recorded video representation if the computed signature of the recorded video representation matches the forbidden signature received by the playing device.

Further in accordance with a preferred embodiment of the present invention the playing device also includes forbidden signature storage apparatus operative to store the forbidden signature, and wherein the playback control apparatus receives the forbidden signature from the forbidden signature storage apparatus.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Figure 1:
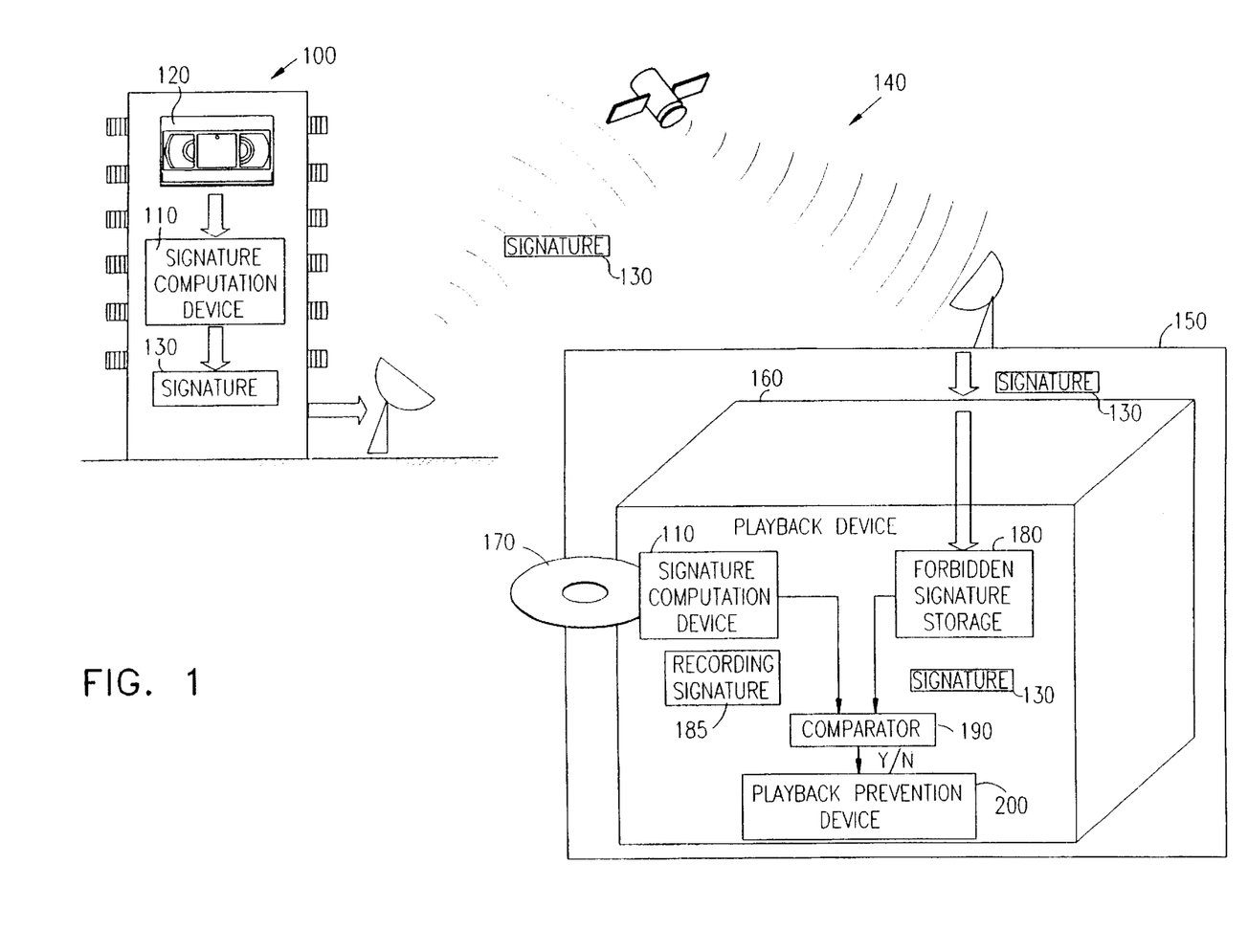
FIG. 1 is a simplified pictorial illustration of an anti-piracy system constructed and operative in accordance with a preferred embodiment of the present invention.

Reference is now made to FIG. 1 which is a simplified pictorial illustration of an anti-piracy system constructed and operative in accordance with a preferred embodiment of the present invention. The system of FIG. 1 preferably comprises, typically in a central security station 100, a signature computation device 110 The signature computation device 110, preferably implemented in a combination of hardware and software as is well known in the art, is typically operative to receive a forbidden video representation 120 as input and to produce a forbidden signature 130, typically a digital signature, as output.

The forbidden video representation 120 may be in any appropriate format, although it is appreciated that a digital format, especially a standard digital format such as MPEG, may be preferred. The forbidden video representation 120 may be provided to the signature computation device 110 in any appropriate form such as, for example, one of the following: a video cassette; a video disc such as a digital video disk (DVD): or an electronic stream whether carried by wire or wirelessly. The forbidden video representation 120 is shown in FIG. 1 as a video cassette by way of example only, and this example is not meant to be limiting.

It is appreciated that the apparatus and methods of the present invention may also be adapted, by a reasonably skilled person of the art, to operate with other types of digital representations other than video representations such as, for example, audio representations. The example of a video representation is used throughout the present specification and claims by way of example only, and is not mean to be limiting. Whenever a term which is particularly associated with video, such as, for example, "frame" or "pixel", is used, it is appreciated that, in the case of other types of digital representations the digital representation may be divided into sub-units and sub-sub-units according to any appropriate rule, the sub-units and sub-sub-units then functioning in the place of frames and pixels, respectively.

The signature computation device 110 is preferably operative to compute a signature, such as a digital signature, of the forbidden video representation 120. Preferably, the method used by the signature computation device 110 is highly sensitive to one or more perceived visual characteristics of the forbidden video representation 120, that is, to visual characteristics which would be perceived by a typical viewer of the forbidden video representation 120.

Typically, the signature produced by the signature computation device 110 will be some appropriate function of the perceived visual characteristics of the forbidden video representation 120. Hence, the signature will be highly dependent on one or more perceived visual characteristics and any attempt by an unauthorized person to alter the signature computed by the signature computation device 110 would likely necessitate changing characteristics of the forbidden video representation 120 which changes would be perceived by a typical user thereof. Furthermore, the signature produced by the signature computation device 110 is preferably highly input-dependent, in the sense that two different video representations provided as input should cause two different signatures to be produced as output, preferably in all such cases.

A preferred method of operation of the signature computation device 110 is described in more detail below with reference to FIG. 3.

The central security station 100 typically also comprises conventional communication apparatus (not shown) operatively associated with the signature computation device 110 and operative to transmit, typically via broadcast transmission, the forbidden signature 130 via any appropriate communications channel such as a satellite communications channel 140.

It is appreciated that a subcombination of the system of FIG. 1 including the apparatus comprised in the central security station 100 may by itself comprise a preferred embodiment of the present invention.

The system of FIG. 1 also preferably comprises, typically at a consumer location 150 a playback device 160. Although a single consumer location 150 and a single playback device 160 are shown in FIG. 1, it is appreciated that the consumer location 150 may alternatively include a plurality of playback devices 160 and the system of FIG. 1 may, and typically will, include a multiplicity of consumer locations 150, each including at least one playback device 160. The depictions of a single consumer location 150 and of a single playback device 160 in FIG. 1 are for purposes of simplicity of description and are not meant to be limiting.

The playback device 160 is preferably adapted to receive and playback for consumer viewing a recorded video representation 170, as is well-known in the art, and preferably comprises conventional components (not shown) for carrying out this purpose. The playback device 160 also preferably comprises conventional communication apparatus (not shown) operative to receive transmissions from the satellite communications channel 140.

The playback device 160 also typically comprises the following components, typically implemented in a combination of hardware and software:

a forbidden signature storage unit 180, operatively associated with the conventional communication apparatus (not shown) and operative to receive the forbidden signature 130 therefrom, to store the forbidden signature 130 and, preferably, other similar signatures which may be broadcast from time to time and to recall for further processing the stored forbidden signature 130;

a signature computation device 10, preferably similar or identical in function to the signature computation device 110 comprised in the central security station 100 and operative to receive as input the recorded video representation 170 and to compute a recording signature 185 therefrom, according to a method producing the same result from the same input as the signature computation device 110 comprised in the central security station 100;

a comparator 190 operatively associated with the signature computation device 110 and with the forbidden signature storage unit 180 and operative to receive therefrom the recording signature 185 and the forbidden signature 130 and to provide a result, based on comparison of the recording signature 185 to the forbidden signature 130, indicating whether the two signatures 185 and 130 match; and a playback prevention device operative, if the result produced by the comparator 190 indicates that the recording signature 185 is the same as the forbidden signature 130, to prevent playback of the recorded video representation 170 by the playback device 160, using any appropriate means for preventing playback as is well-known in the art.

Some or all of the signature computation device 110, the forbidden signature storage unit 180, the comparator 190, and the playback prevention device 200 may be implemented in one or more integrated circuit devices or one or more microprocessors, as is well known in the art.

The operation of the system of FIG. 1 is now briefly described. A forbidden video representation 120, the playing of which on consumer devices is to be prevented, is preferably chosen and presented as input to the signature computation device 110. As explained above, the forbidden video representation 120 may be in any appropriate format, chosen to be compatible with one or more formats accepted by the signature computation device 110 and typically comprises a video work, such as a copyrighted video work, which is unreleased or otherwise unavailable to the public.

The signature computation device 10 preferably computes a forbidden signature 130 as described above. The forbidden signature 130 is then preferably transmitted via the satellite communications channel 140 to the playback device 160. At the playback device 160, the forbidden signature 130 or an appropriate derived representation thereof such as, for example, an appropriate hash thereof, is typically stored in the forbidden signature storage unit 180. It is appreciated that the forbidden signature 130 or the appropriate derived representation may also be used immediately, without storage in the forbidden signature storage unit 180; in such a case, the forbidden signature storage unit 180 may be optional.

As explained above, upon presentation of a recorded video representation 170 for playback by the playback device 160 a recording signature 185 of the recorded video representation 170 is preferably computed and compared to the stored forbidden signature 130 by the comparator 190.

Preferably, if the signatures 130 and 185 do not match, playback of the recorded video representation 170 is allowed. Preferably, if the signatures 130 and 185 do match, indicating that the recorded video representation 170 includes a forbidden video representation, playback of the recorded video presentation 170 is forbidden.

Thus, the system of FIG. 1 provides anti-piracy protection against pirate copies of the forbidden video representation 120.

It is appreciated that the forbidden signature storage unit 180 may be operative to store a plurality of signatures 130 associated with a plurality of different forbidden video representations 1220, including variant representations of a single forbidden video representation 120. For example, a pirate might create such a variant representation by attempting to alter the signature of a pirated recorded video representation 170 by changing the content thereof such as, for example, by deleting a small portion such as a small beginning portion thereof It is appreciated that an effective anti-piracy defense against such a measure might comprise obtaining such an altered video representation and using the altered video representation as input to the signature computation device 110 in place of the forbidden video representation 120, thus causing the altered video representation to also be forbidden. It is further appreciated that a beginning of a particular scene may be identified using methods well known in the art, and signature computation may be based on the beginning of the particular scene rather than the beginning of the recorded video representation 170, thus also providing an effective anti-piracy defense against deletion of a small beginning portion of the recorded video representation 170.

It is further appreciated that it might be desirable to cancel the forbidden signature 130 previously broadcast, thus allowing playback of a recorded video representation 170 having the same signature as the forbidden video representation 120. This might be the case, for example, when legitimate copies of the previously unreleased forbidden video representation 120 are released. In such a case, it would be desirable to broadcast a special message canceling the forbidden signature 130, in response to which the playback device 160 would erase the forbidden signature 130 from the forbidden signature storage unit 180, thus permitting playback. Methods for ensuring the legitimacy of such a message, including requiring that such a message be cryptographically signed, are well-known in the art, particularly in the art of pay television where authorization and restriction messages typically require authentication. It is further appreciated that, because of security considerations, it may be preferable to employ such methods for ensuring legitimacy both in broadcast of a special message and in broadcast of the forbidden signature 130 as described above.

It is still further appreciated that appropriate methods are preferably employed to help ensure delivery of the forbidden signature 130 despite piracy attempts. For example, the forbidden signature 130 may be delivered during playback of a non-forbidden recorded video representation, the forbidden signature 130 typically being comprised in an authorization message authorizing playback of the non-forbidden recorded video representation. Such authorization messages are well-known in the art of television conditional access.

Figure 2:
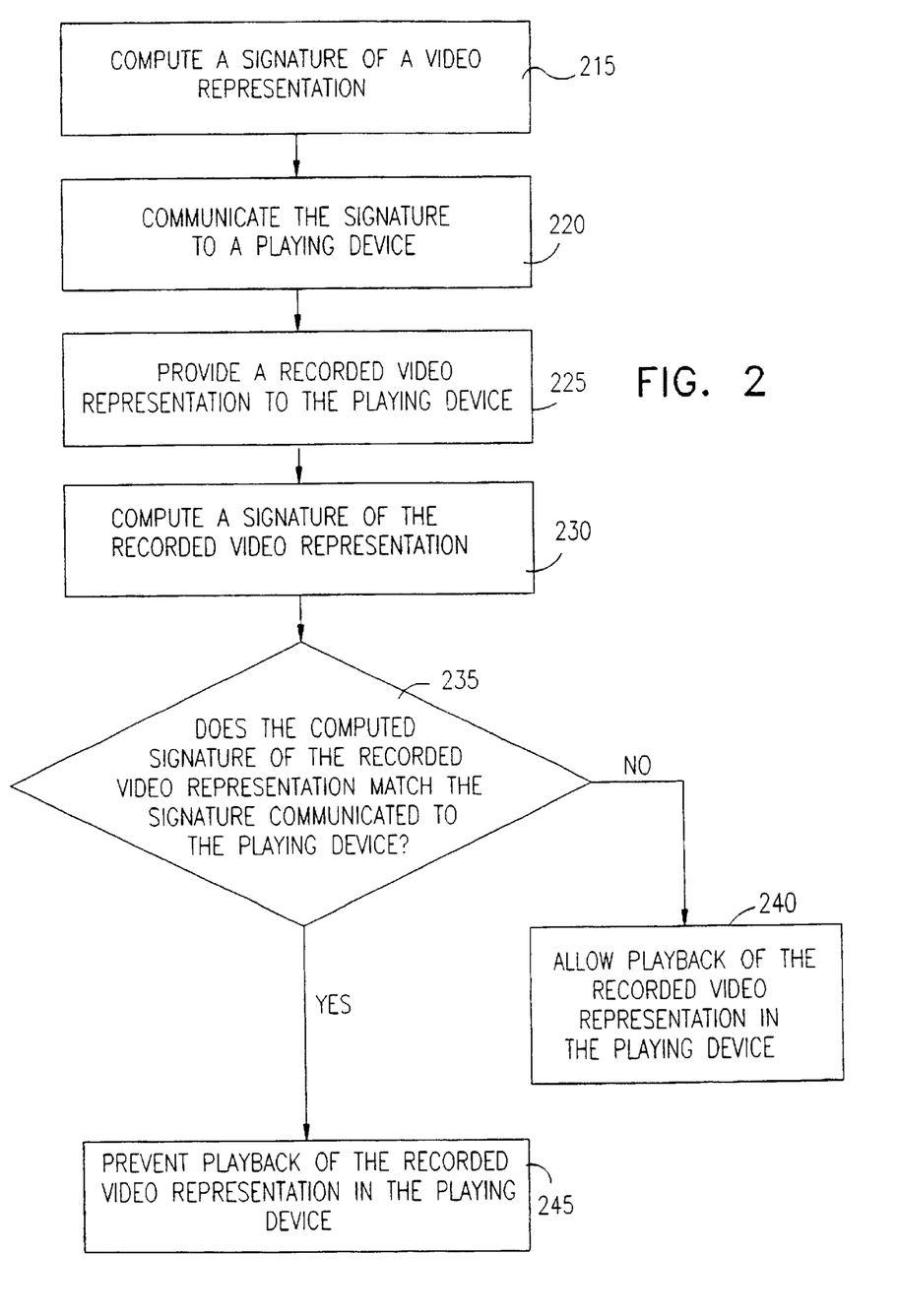
FIG. 2 is a simplified flowchart illustration of a preferred method of operation of the system of FIG. 1.

Reference is now made to FIG. 2. which is a simplified flowchart illustration of a preferred method of operation of the system of FIG. 1. The method of FIG. 2 preferably comprises the following steps:

A forbidden signature of a forbidden video representation is computed (step 215). As described above with reference to FIG. 1, the signature computation of step 215 is preferably based on visible characteristics of the forbidden video representation and is preferably sensitive to visible differences in the forbidden video representation, while being insensitive to invisible differences in the forbidden video representation. A preferred implementation of step 215 is described in more detail below with reference to FIG. 3, but it is appreciated that any other appropriate implementation may alternatively be used.

The forbidden signature computed in step 215 is communicated to a playing device (step 220). Typically at a later time, a recorded video representation is provided to the playing device for playback (step 225). A signature of the recorded video representation is computed (step 230); preferably, the computation in step 230 is similar to that in step 215, as described above, in that the computation in step 230 is preferably either identical to that in step 215 or so designed as to always produce, from a given input, the same output produced by the computation of step 215.

A check is made as to whether the computed signature of the recorded video representation matches the forbidden signature communicated to the playing device (step 235); if not, playback of the recorded video representation is preferably allowed (step 240). If, however, the forbidden signature matches the computed signature of the recorded video representation, playback of the recorded video representation is preferably forbidden (step 245).

It may be preferable in step 235 to require an exact match between the signatures being compared in order for a match to be determined by, step 235, alternatively, any appropriate function of similarity might be applied to determine that the signatures being compared are sufficiently similar for a match to be determined by step 235. It is appreciated that an appropriate function of similarity might be used in a case where a signature method used in steps 215 and 230 is designed to produce similar signatures for similar inputs, with the function of similarity of step 235 being chosen accordingly.

Figure 3:
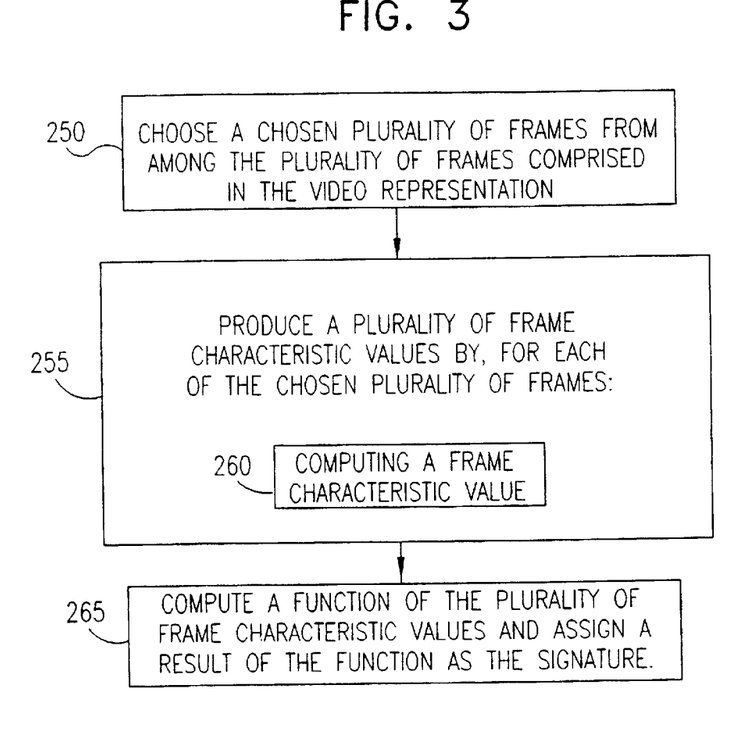
FIG. 3 is a simplified flowchart illustration of a preferred implementation of steps 215 and 230 of FIG. 2.

Reference is now made to FIG. 3, which is a simplified flowchart illustration of a preferred implementation of steps 215 and 230 of FIG. 2. The method of FIG. 3 preferably includes the following steps:

A chosen plurality of frames is chosen from among the plurality of frames comprised in the forbidden video representation (250). The chosen plurality of frames may be chosen according to some fixed rule, such as the first n frames of the video representation, where n is a predetermined number such as, for example, 32. Alternatively, n frames other than the first n frames may be chosen. Further alternatively, n may be a variable parameter, typically chosen according to some appropriate predetermined method accepting one or more characteristics of the forbidden video representation as input and producing n as output, and typically varying from one forbidden video representation to another according to any appropriate rule.

It is appreciated that, particularly in the case of compressed digital formats of video representation, certain frames may include more information about what is visible to a viewer than other frames, and choosing from those certain frames to make up the chosen plurality of frames would be preferable to choosing from other frames. For example, and without limiting the generality of the foregoing, it is well-known in the art that, in an MPEG video representation, I-frames include full frame information and thus include more information about what is visible to a viewer than do P-frames and B-frames, which represent differences between frames rather than full frame information. Therefore, in a case where the forbidden video representation comprises an MPEG video representation, it would be preferable to choose the chosen plurality of frames from among I-frames comprised in the MPEG video representation.

It is further appreciated that, in the case of other compressed digital formats such as texture coding techniques using DCT blocks, as is well-known in the art, other appropriate information, such as DC coefficients of DCT blocks, may alternatively be used, in place of I-frames in an MPEG representation. Similarly, in a format using wavelets, as is well-known in the art, coefficients of the lowest frequency wavelet sub-band might be used.

A plurality of frame characteristic values is produced by performing an appropriate operation on each of the chosen plurality of frames (step 255); the appropriate operation preferably comprises computing a frame characteristic value for each of the chosen plurality of frames (step 260); alternatively, a similar method may be employed on subsequences of the chosen plurality of frames rather than on individual ones of the chosen plurality of frames. In step 260 a method of computing the frame characteristic value is preferably chosen to produce the qualities of sensitivity to changes in the frame described above with reference to step 215 of FIG. 2. Without limiting the generality of the foregoing, a preferred implementation of step 260 is described more fully below with reference to FIG. 4.

A function of the plurality of frame characteristic values is computed and the result of computing the function is assigned as the signature (step 265). Typically, the function of step 265 comprises concatenation of the plurality of frame characteristic values. The function of step 265 may also comprise encrypting and/or digitally signing the concatenation, as described above with reference to FIG. 1. Alternatively, any other appropriate function may be used.

Figure 4:
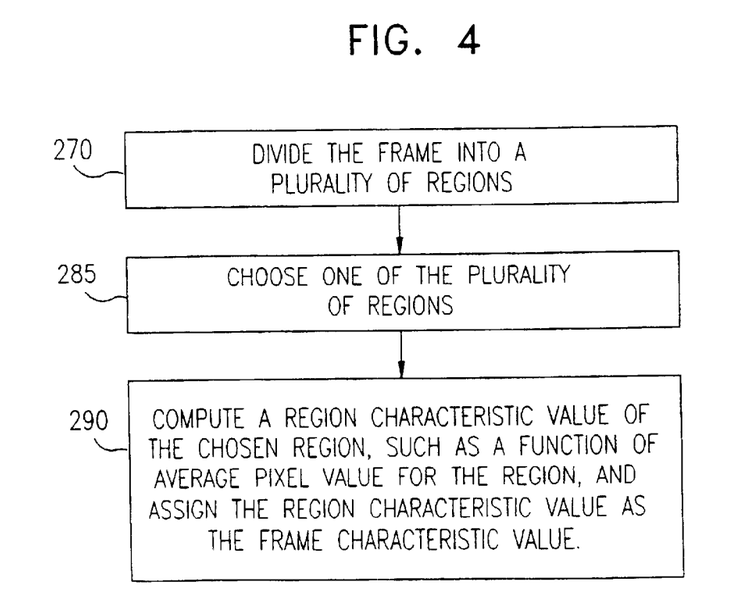
FIG. 4 is a simplified flowchart illustration of a preferred implementation of step 260 of FIG. 3.

Reference is now made to FIG. 4, which is a simplified flowchart illustration of a preferred implementation of step 260 of FIG. 3. The method of FIG. 4 preferably includes the following steps:

Each frame is divided into a plurality of regions (step 270).

Figure 5:
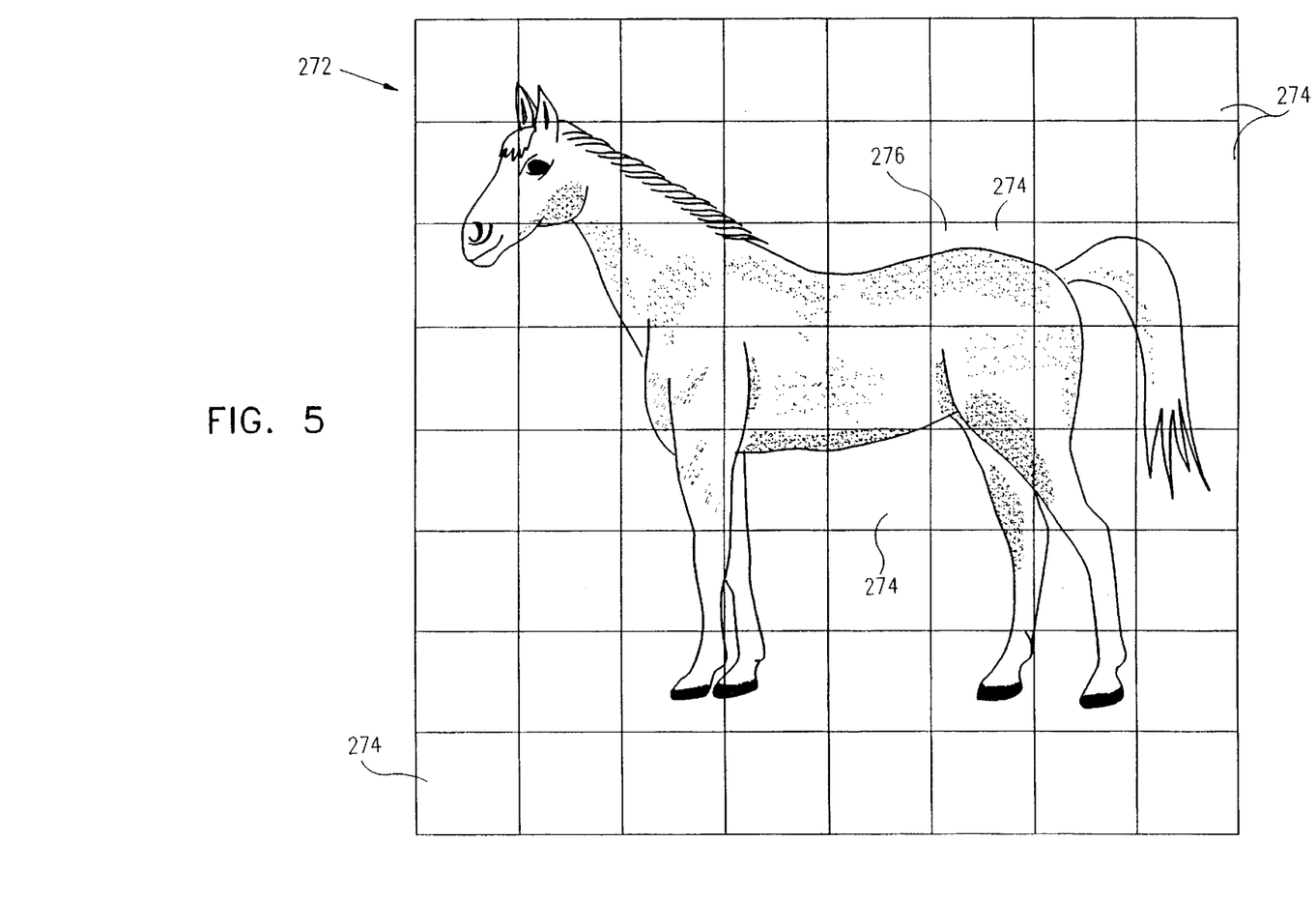
FIG. 5 is a simplified pictorial illustration of a frame of a video representation, useful in understanding the method of FIG. 4.

Reference is now additionally made to FIG. 5, which is a simplified pictorial illustration of a frame of a video representation, useful in understanding the method of FIG. 4. In FIG. 5 a frame 272 is shown divided, for purposes of computation into a plurality of regions 274.

One of the plurality of regions, such as a chosen region 276 of FIG. 5, is chosen from among the plurality of regions 274 of FIG. 5 (step 285). It is appreciated that any of a wide variety of methods might be used for determining which of the plurality of regions 274 is chosen as the chosen region 276, and that the method used for choosing in step 285 may depend on a function used in step 290, described below. One possible method for choosing is as follows:

Typically, the frame 272 of FIG. 5 comprises a multiplicity of pixels (not shown), as is well-known in the art. Each pixel typically has a value such as, for example, an integer value between 0 and 255 inclusive. Depending on whether the frame 272 comprises a color frame, a grayscale frame, or some other type of frame, the meaning of each of the possible pixel values varies accordingly, as is well-known in the art.

An average pixel value is computed over all pixels of the frame 272, resulting in a frame average pixel value (FAPV). One or more of the plurality of regions 274 is examined, and a region average pixel value (RAPV) is computed for each examined region. Any of the examined regions for which the RAPV is greater than the FAPV is chosen as the chosen region 276.

Figure 6:
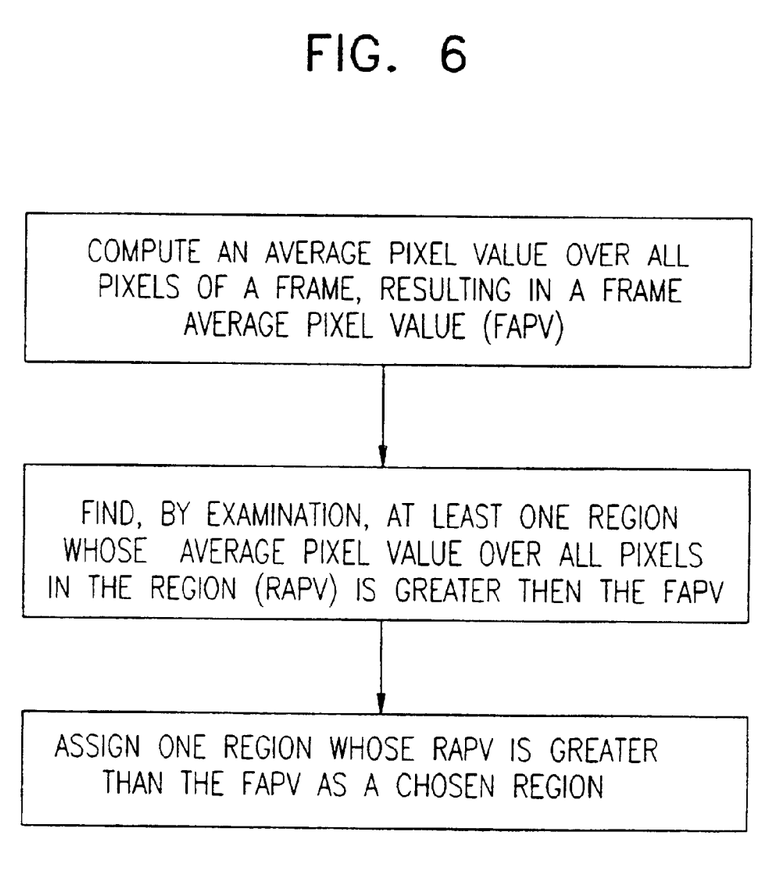
FIG. 6 is a simplified flowchart illustration of a preferred implementation of step 285 of FIG. 5.

Reference is now additionally made to FIG. 6, which is a simplified flowchart illustration of a preferred implementation of step 285 of FIG. 5. The method of FIG. 6 is self-explanatory in light of the above discussion.

A region characteristic value of the chosen region is computed and assigned as the frame characteristic value (step 290). One possible example of a method of computing region characteristic value, compatible with the method of FIG. 6 as described above, is computing the RAPV of the region and assigning a one-bit region characteristic value of "1" if the RAPV is greater than the FAPV, and assigning a value of 0.

It is appreciated that, in case the method of FIG. 6 is used along with the RAPV method for step 290, step 290 produces a value of 1 as the frame characteristic value of the first frame of the chosen plurality of frames of step 250 of FIG. 3, described above. In a case where the function of step 265 of FIG. 3 is a concatenation function, as described above, the first bit of the signature computed by step 265 of FIG. 3 will be a "1"bit, which may be preferred.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow.

What is claimed is:

1. A method for assigning a signature to a video representation, the video representation comprising a plurality of frames, the method comprising:
    choosing a chosen plurality of frames from among the plurality of frames comprised in the video representation;
    for each of the chosen plurality of frames, computing a frame characteristic value, thus producing a plurality of frame characteristic values;
    computing a function of the plurality of frame characteristic values and assigning a result of the function as the signature;
    communicating the signature to a playing device;
    providing a recorded video representation to the playing device;
    computing a signature of the recorded video representation; and
    preventing playback of the video representation in the playing device if the computed signature of the recorded video representation matches the signature communicated to the playing device.

2. A method according to claim 1 and wherein the function comprises concatenation of the plurality of frame characteristic values.

3. A method according to claim 1 and wherein the video representation comprises an MPEG representation, and
    each of the chosen plurality of frames comprises an I-frame.

4. A method according to claim 1 and wherein the step of preventing playback comprises:
    preventing playback of the video representation in the playing device if the computed signature of the recorded video representation is identical to the signature communicated to the playing device.

5. A method according to claim 1 and wherein the step of preventing playback comprises:
    employing a signature comparison method to determine whether the computed signature of the recorded video representation matches the signature communicated to the playing device, and
    the signature comparison method includes determining that a first signature and a second signature match even if the first signature is not identical to the second signature.

6. A method according to claim 1 and wherein the step of computing a frame characteristic value comprises:
    dividing the frame into a plurality of regions;
    choosing one of the plurality of regions; and
    computing a region characteristic value of the chosen region and assigning the region characteristic value as the frame characteristic value.

7. A method according to claim 6 and wherein the region characteristic value comprises a function of average pixel value for the region.

8. A method according to claim 7 and wherein the function of average pixel value produces a 1-bit value.

9. A method according to claim 8 and wherein the function of average pixel value produces a 1-bit value of "1" for a first one of the chosen plurality of frames.

10. A method according to claim 6 and wherein the step of dividing the frame into a plurality of regions comprises, for each frame in the chosen plurality of frames, dividing the frame into a plurality of regions each corresponding to one of the plurality of regions into which every other frame of the chosen plurality of frames is divided.

11. A method according to claim 10 and wherein the step of choosing one of the plurality of regions comprises choosing, for each frame in the chosen plurality of frames, a region corresponding to the region chosen in every other frame of the chosen plurality of frames.

12. A method according to claim 10 and wherein the step of choosing one of the plurality of regions comprises choosing, for at least one frame in the chosen plurality of frames, a region not corresponding to a region chosen in at least one other frame of the chosen plurality of frames.

13. A system for assigning a signature to a video representation, the video representation comprising a plurality of frames, the system comprising:
    frame selection apparatus for choosing a chosen plurality of frames from among the plurality of frames comprised in the video representation;
    a frame characteristic determination unit operative, for each of the chosen plurality of frames, to compute a frame characteristic value, thus producing a plurality of frame characteristic values;
    signature apparatus for computing a function of the plurality of frame characteristic values and assigning a result of the function as the signature; and
    communication apparatus for communicating the signature to a playing device,
    wherein the playing device comprises:
        a receiving unit for receiving a recorded video representation;
        signature apparatus for computing a signature of the recorded video representation; and
        playback control apparatus for preventing playback of the video representation in the playing device if the computed signature of the recorded video representation matches the signature communicated to the playing device.

14. A method for assigning a signature to a video representation, the video representation comprising a plurality of frames, the method comprising:
    choosing a chosen plurality of frames from among the plurality of frames comprised in the video representation;

for each of the chosen plurality of frames, computing a frame characteristic value, thus producing a plurality of frame characteristic values;

computing a function of the plurality of frame characteristic values and assigning a result of the function as the signature; and communicating the signature to a playing device, wherein the step of computing a frame characteristic value comprises:
dividing the frame into a plurality of regions;
choosing one of the plurality of regions; and
computing a region characteristic value of the chosen region and assigning the region characteristic value as the frame characteristic value, and
the region characteristic value comprises a function of average pixel value for the region, and
the function of average pixel value produces a 1-bit value.

15. A method according to claim 14 and wherein the function comprises concatenation of the plurality of frame characteristic values.

16. A method according to claim 14 and wherein the video representation comprises an MPEG representation, and
each of the chosen plurality of frames comprises an I-frame.

17. A method according to claim 14 and also comprising:
providing a recorded video representation to the playing device;
computing a signature of the recorded video representation; and
preventing playback of the video representation in the playing device if the computed signature of the recorded video representation matches the signature communicated to the playing device,
wherein the step of preventing playback comprises:
preventing playback of the video representation in the playing device if the computed signature of the recorded video representation is identical to the signature communicated to the playing device.

18. A method according to claim 14 and also comprising:
providing a recorded video representation to the playing device;
computing a signature of the recorded video representation; and
preventing playback of the video representation in the playing device if the computed signature of the recorded video representation matches the signature communicated to the playing device,
wherein the step of preventing playback comprises:
employing a signature comparison method to determine whether the computed signature of the recorded video representation matches the signature communicated to the playing device, and
the signature comparison method includes determining that a first signature and a second signature match even if the first signature is not identical to the second signature.

19. A method according to claim 14 and wherein the function of average pixel value produces a 1-bit value of "1" for a first one of the chosen plurality of frames.

20. A method according to claim 14 and wherein the step of dividing the frame into a plurality of regions comprises, for each frame in the chosen plurality of frames, dividing the frame into a plurality of regions each corresponding to one of the plurality of regions into which every other frame of the chosen plurality of frames is divided.

21. A method according to claim 20 and wherein the step of choosing one of the plurality of regions comprises choosing, for each frame in the chosen plurality of frames, a region corresponding to the region chosen in every other frame of the chosen plurality of frames.

22. A method according to claim 20 and wherein the step of choosing one of the plurality of regions comprises choosing, for at least one frame in the chosen plurality of frames, a region not corresponding to a region chosen in at least one other frame of the chosen plurality of frames.

23. A system for assigning a signature to a video representation, the video representation comprising a plurality of frames, the system comprising:
frame selection apparatus for choosing a chosen plurality of frames from among the plurality of frames comprised in the video representation;
a frame characteristic determination unit operative, for each of the chosen plurality of frames, to compute a frame characteristic value, thus producing a plurality of frame characteristic values;
signature apparatus for computing a function of the plurality of frame characteristic values and assigning a result of the function as the signature; and
communication apparatus for communicating the signature to a playing device,
wherein the frame characteristic determination unit is operative to compute the frame characteristic value by:
dividing the frame into a plurality of regions;
choosing one of the plurality of regions; and
computing a region characteristic value of the chosen region and assigning the region characteristic value as the frame characteristic value, and
the region characteristic value comprises a function of average pixel value for the region, and
the function of average pixel value produces a 1-bit value.

24. An anti-piracy method comprising:
computing a forbidden signature of a forbidden video representation;
communicating the forbidden signature to a playing device;
providing a recorded video representation to the playing device;
computing a signature of the recorded video representation; and
preventing playback of the recorded video representation in the playing device if the computed signature of the recorded video representation matches the forbidden signature communicated to the playing device.

25. A method according to claim 24 and also comprising:
storing the forbidden signature at the playing device; and
retrieving the forbidden signature before performing the preventing playback step.

26. An anti-piracy system comprising:
video representation signature apparatus for computing a forbidden signature of a forbidden video representation;
communication apparatus for communicating the forbidden signature to a playing device; and
a playing device adapted to receive and play back a recorded video representation, the playing device comprising:
reception apparatus for receiving the forbidden signature communicated by the communication apparatus;
recorded video representation signature apparatus for computing a signature of the recorded video representation; and playback control apparatus operative to prevent playback of the recorded video representation if the computed signature of the recorded video representation matches the forbidden signature communicated to the playing device.

27. A system according to claim 26 and wherein the reception apparatus is operative to receive the forbidden signature during playback of a non-forbidden recorded video representation.

28. A system according to claim 27 and wherein the reception apparatus is also operative to receive an authorization message authorizing playback of the non-forbidden recorded video representation, and the authorization message comprises the forbidden signature.

29. A playing device adapted to receive and play back a recorded video representation the playing device comprising:

reception apparatus for receiving a forbidden signature of a forbidden video representation;

recorded video representation signature apparatus for computing a signature of the recorded video representation; and playback control apparatus operative to prevent playback of the recorded video representation if the computed signature of the recorded video representation matches the forbidden signature received by the playing device.

30. Apparatus according to claim 29 and also comprising:

forbidden signature storage apparatus operative to store the forbidden signature, and wherein the playback control apparatus receives the forbidden signature from the forbidden signature storage apparatus.

* * * * *